United States Patent
Vos et al.

(10) Patent No.: US 6,171,055 B1
(45) Date of Patent: Jan. 9, 2001

(54) SINGLE LEVER POWER CONTROLLER FOR MANNED AND UNMANNED AIRCRAFT

(75) Inventors: David W. Vos, Boston, MA (US); Benjamin Russ, Catlett, VA (US)

(73) Assignee: Aurora Flight Sciences Corporation, Manassas, VA (US)

( * ) Notice: Under 35 U.S.C. 154(b), the term of this patent shall be extended for 0 days.

(21) Appl. No.: 09/054,411

(22) Filed: Apr. 3, 1998

(51) Int. Cl.[7] .................................................. B64C 11/34
(52) U.S. Cl. .................................. 416/1; 416/27; 416/28; 416/29; 416/30; 416/36; 416/37; 416/39; 416/40; 416/47; 416/48; 60/602; 701/7; 701/10; 701/99
(58) Field of Search .................................. 416/1, 27, 28, 416/29, 30, 36, 37, 38, 39, 40, 44, 47, 48; 60/602; 701/4, 7, 10, 99

(56) References Cited

U.S. PATENT DOCUMENTS

| | | |
|---|---|---|
| 3,517,509 | 6/1970 | Bayati . |
| 3,971,208 | 7/1976 | Schwent . |
| 4,958,289 * | 9/1990 | Sum et al. .............................. 416/27 |
| 5,209,640 * | 5/1993 | Moriya ................................... 416/27 |
| 5,315,819 | 5/1994 | Page et al. . |
| 5,997,250 * | 12/1999 | Carter, Jr. et al. ..................... 416/27 |
| 6,004,098 * | 12/1999 | Chevallier et al. .................... 416/30 |

FOREIGN PATENT DOCUMENTS 0 392 965    10/1990   (EP) .
2 386 686     3/1978   (FR) .

* cited by examiner

Primary Examiner—Christopher Verdier
(74) Attorney, Agent, or Firm—Fitzpatrick, Cella, Harper & Scinto (57) ABSTRACT

Method and apparatus for controlling an aircraft engine with a single, manually-operable lever includes structure and function for generating a pilot thrust command from the single lever. A processor is coupled to the single lever and (i) receives the generated pilot thrust command, (ii) receives a plurality of detected ambient air flight conditions, (iii) receives a plurality of detected engine performance parameters, (iv) determines first and second engine control commands based on the received pilot thrust command, the detected ambient air flight conditions, and the engine performance parameters, and (v) outputs first and second output signals respectively corresponding to the first and second engine control commands. Preferably, the engine control commands comprise propeller RPM and engine inlet manifold air pressure commands, and the detected ambient air flight conditions comprise air speed and altitude.

23 Claims, 8 Drawing Sheets

SINGLE LEVER POWER CONTROLLER FOR MANNED AND UNMANNED AIRCRAFT

BACKGROUND OF THE INVENTION

1. Field of the Invention

The present invention relates to a method and apparatus for controlling the thrust of an aircraft engine using a single lever power controller.

2. Related Background

A plurality of levers are required to control aircraft engines in general aviation, commercial aviation, and unmanned aircraft. For example, a throttle lever is required to control the throttle blade, a fuel mixture lever is required to control the fuel mixture, a propeller pitch lever may be required to control the RPM of the propeller or turbine fan, a waste gate lever is typically required to control the exhaust waste gate in engines which are turbo-charged, a propeller governor lever is often required to control the propeller governor, etc. The pilot is required to control all of these levers simultaneously to achieve the most efficient engine performance for the given flight conditions. This is often a hit-and-miss procedure based on the pilot's experience, and thus the engine generally is not optimized to operate in a fuel-efficient manner to produce the optimum thrust. Also, continually monitoring these many control levers increases the pilot's workload leading to pilot fatigue and reduced attention to other necessary pilot tasks. In an emergency situation, the pilot may not be able to achieve optimum engine control, leading to engine failure or loss of controlled flight. These problems are exacerbated in unmanned air vehicles (UAV's) since the pilot is remote from the aircraft and lacks sensory input regarding flight conditions.

In the field of engine control, many proposals exist for controlling the flow of fuel to the engine in accordance with detected engine operating parameters such as engine temperature, engine pressure ratio, shaft speed, etc. to maximize fuel efficiency, but such proposals fail to take into account the ambient operating conditions. Proposals of this type are described in U.S. Pat. Nos. 4,248,042; 4,551,972; 4,686,825; 5,029,778; 5,039,037; 5,277,024; and 5,613,652. However, even if such systems were adapted to aviation, the pilot would still be required to operate and continually adjust a plurality of control levers to optimize engine thrust for given flight conditions.

By 1985, it was recognized that aircraft engine efficiency is highest when the engine is run with the throttle butterfly valve fully open and the desired performance is obtained by varying propeller speed. See, for example, SAE Technical Paper Series 850895, "The Porsche Aircraft Engine PFM 3200", Helmuth Bott and Heinz Dorsch, 1985. This article proposed a single-lever control system for an aircraft engine that operates both the throttle and the propeller governor with a single lever. However, the proposed system is a mechanical linkage system which accordingly cannot optimize engine performance based on various ambient flight conditions. That is, the Porsche system may work well at a single altitude, speed, and temperature, but will seriously degrade at other flight conditions.

Thus, what is needed is a single lever power controller apparatus and a method for controlling an aircraft engine to achieve the maximum thrust efficiency throughout the flight performance envelope of the aircraft.

SUMMARY OF THE INVENTION

The present invention is intended to overcome the drawbacks of known aircraft engine control systems by providing a processor-controlled system which inputs a single thrust or power command, receives detected ambient flight conditions, and automatically controls the engine speed, (e.g., propeller RPM) and engine load (e.g., manifold air pressure (MAP)) for the detected flight conditions and relative to the requested thrust or power command.

According to a first aspect of the present invention, a single lever power control apparatus for controlling an aircraft engine includes a single, manually-operable lever for generating a pilot thrust command. A processor receives the generated pilot thrust command, receives a plurality of detected ambient air conditions, and determines an engine speed activation command and an engine load activation command based on the maximum thrust efficiency for the detected ambient flight conditions and thrust command. In one embodiment, the thrust efficiency optimization is performed off-line where the processor accesses a look-up table which stores highest thrust efficiency values for the detected flight conditions and thrust command. In another embodiment, the optimization is performed on-line where the processor determines the highest thrust efficiency values by varying the existing values and determining any change in the rate of climb. A positive change indicates more efficient thrust values, and these will be used to control the engine.

According to a further aspect of the present invention, control apparatus for use with a single lever aircraft engine power control device includes a first input for receiving detected airspeed, a second input for receiving detected air pressure, and a third input for receiving a thrust command from the single lever power control device. A memory stores propeller RPM and MAP commands for predetermined airspeed, air pressure, and thrust command conditions. A processor selects a propeller RPM command and a MAP command from said memory to produce maximum thrust efficiency for the detected air speed, the detected air pressure, and the received thrust command. The processor may also receive the detected actual propeller RPM and the detected actual manifold air pressure and produce a propeller RPM actuator command and a MAP actuator command based on the detected RPM and MAP values and the RPM and MAP commands selected from memory.

According to another aspect of the present invention, apparatus for controlling an aircraft engine having a rotating mechanism and an air inlet includes a single, manually-activated structure for providing an engine thrust command. A processor is provided for receiving the engine thrust command and detected ambient air conditions, and determines first and second control commands for the aircraft engine. The processor determines the first and second control commands based on the received engine thrust command, the detected ambient air conditions, and a maximum thrust efficiency value for the detected ambient air conditions.

According to yet another aspect of the present invention, a method for controlling an aircraft engine with a single lever power control device includes the steps of (i) generating an engine thrust command with a single lever power control device, (ii) detecting ambient flight conditions, (iii) determining an engine rotation command and an engine load command based on the generated thrust command, the detected ambient flight conditions, and a predetermined maximum thrust efficiency value for the detected ambient air flight conditions, and (iv) outputting first and second engine control signals based respectively on the engine rotation command and the engine load command.

According to a further aspect of the present invention, a storage medium for storing computer-readable instructions for causing an aircraft computer to control an aircraft engine comprises instructions for causing the aircraft computer to read a thrust command from a manually-operable, single lever power control device, instructions for causing the aircraft computer to read detected ambient air flight conditions, and instructions for causing the aircraft computer to access a memory with the thrust command and to read therefrom a predetermined engine rotation command and a predetermined engine load command. The engine rotation command and the engine load command are predetermined for maximum thrust efficiency at the detected ambient air flight conditions.

BRIEF DESCRIPTION OF THE DRAWINGS

The novel structure and functions according to the present invention will become readily apparent to those of ordinary skill in the art from the following detailed description of the preferred embodiments taken together with the accompanying drawings which show.

DETAILED DESCRIPTION OF THE PREFERRED EMBODIMENTS

1. Introduction

Power plants of general aviation and lightweight aircraft are controlled by the pilot using various levers. Through direct cable connections, the pilot must select the throttle valve opening, the propeller pitch, the fuel mixture, etc. The general aviation pilot is not always familiar with the most efficient match between engine and propeller performance. Therefore, the selected operating conditions can be far different from the best performance point and sometimes far different from safe operating conditions. The present invention proposes a single lever power controller which provides a single command from the pilot to the entire power plant management system which will automatically select the optimum performance parameters for any desired flight condition. The pilot is now free to concentrate on navigation and the flight controls. The embodiments described herein combine all required power plant and propeller control signals into an integrated single lever power control system.

In the embodiments described below, a single lever power control device provides a single thrust command to the flight computer, and the flight computer then controls the engine RPM through pitch control of the propeller, and controls the intake manifold air pressure through the throttle butterfly. The propeller speed command and the MAP command are selected from a look-up table to provide the maximum thrust efficiency for the detected ambient flight conditions (e.g., air speed, air pressure, and preferably air temperature). Thus, the single lever controls the engine manifold pressure (which may be turbo-charged) to the desired level, while simultaneously and automatically determining the most efficient RPM (or propeller speed) for the given flight conditions. The resulting system is extremely simple to operate and can substantially reduce the pilot workload, especially in emergency conditions. The system constantly seeks the optimal combination of engine and propeller efficiency, which results in substantially improved fuel consumption and reduced emissions. The system is perfectly suited for general aviation aircraft where pilots are generally unfamiliar with the most efficient operating points of the engine/variable-pitch-propeller combination for given flight conditions. Of course, the MAP command may be configured to control any torque management system of the aircraft. Additionally, the present invention will find great use in the field of unmanned aircraft where the pilot is remote from the aircraft.

In certain general aviation aircraft, the settings of the propeller governor and the waste gate (in a waste-gated, turbo-charged engine) are controlled automatically by mechanical systems which follow the command input from the pilot to the engine. The pilot may directly control, through levers, the engine throttle and fuel mixture. Even when the variable pitch propeller is directly controlled by the pilot, it is quite difficult for the average pilot to achieve a steady flight condition to maximize power plant efficiency. In the present invention, power plant settings for predetermined flight conditions may be mapped in advanced for best efficiency and stored in memory and recalled in the air when the pilot selects a desired thrust.

The present invention dovetails nicely with the advances recently made in electronic control of engine parameters such as fuel mixture, operating temperature, etc. Engine control units (ECU's) and power plant control units (PCU's) are used in the automotive industry to digitally fine-tune fuel consumption in the power plant. However, more complex ECU's and PCU's, if used in combination with traditional pilot throttle and propeller controls, may lead to confusing flight commands with catastrophic results. For example, in the China Airliner Airbus A 300 crash in the spring of 1994, the pilots were fighting autopilot go-around commands and were unable to safely control the airplane. By combining known ECU and PCU controls with the single lever power controller according to the present invention, conflicts between engine control and aircraft control will be eliminated. Thus, the full authority, hierarchical structure described below will allow the pilot, with a single lever, to achieve maximum power plant thrust efficiency with the use of a single thrust lever.

The single lever power controller according to the present invention is especially suited for unmanned air vehicles (UAV's), since the UAV pilot sits on the ground and has no sensory perception of flight (acceleration, vibrations, acoustical, visual input, etc.) to assist him/her in controlling the aircraft. However, the single lever power controller (SLPC) structure and functions described below may also be adapted to other air vehicles such as turbine jet aircraft and rotary wing aircraft.

In addition, application of the SLPC in aircraft can serve to improve emissions regardless of the pilot's style. By replacing the throttle with a power control system designed to control inlet manifold pressure, and placing constraints on the allowable commanded MAP for a given flight condition (e.g., limiting too-high MAP commands when the engine is in a low speed condition), transition to a higher power output condition is reached in a well-controlled fashion, which can be designed to always achieve efficient combustion, and hence reduced emissions. Likewise, in the case of decelerating, where an unacceptably rich mixture often results from too rapid throttle movement, efficient combustion can be maintained with such a system.

In summary, the SLPC according to the present invention can achieve reduced pilot work load, optimized engine control, improved safety (through limiting RPM and MAP commands to safe operating modes), a simplified pilot-power plant interface, improved engine reliability and life, and may be integrated into a Full-Authority Digital Electronic Control Unit (FADEC).

While the present invention is described with respect to an SLPC for use in aircraft engines, those of skill in the art will appreciate that other applications may include underwater and ground manned and unmanned vehicles.

2. The Structure

Figure 1:
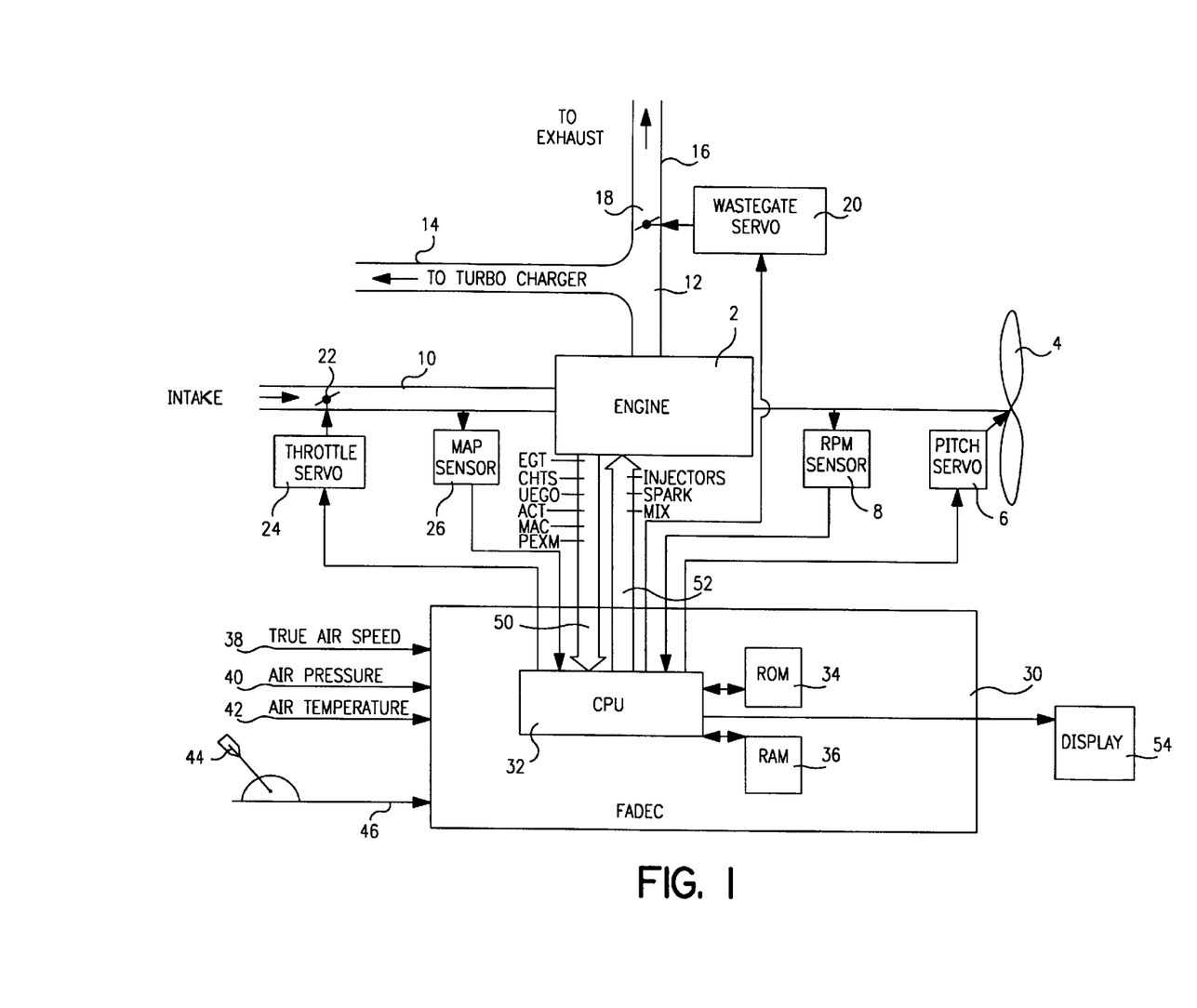
FIG. 1 is a block diagram of the structure according to an embodiment of the present invention.

FIG. 1 depicts the structure according to a preferred embodiment of the present invention in which engine 2 comprises a known aircraft engine, for example, a ROTAX 912 4-cylinder, horizontally opposed, turbo-charged, liquid-cooled, fuel-injected engine which may be used in Aurora Flight Sciences' Perseus B UAV. Propeller 4 may comprise any known aircraft propeller, for example, a McCauley propeller with governor. Pitch servo 6 changes the pitch of propeller 4 which will change its RPM, and this change in RPM can be detected by RPM sensor 8.

Engine 2 has an intake manifold 10 and an exhaust manifold 12. The exhaust manifold 12 has two branches, a branch 14 which provides output to the turbo charger (not shown), and a branch 16 which is vented to the atmosphere. A movable waste gate 18 controls the balance of exhaust gases between branch 14 and 16 so as to control the amount of exhaust gases provided to the turbo charger. A waste gate servo 20 controls the position of the waste gate valve 18 in accordance with feedback from the turbocharger boost pressure (to be described below).

The intake manifold 10 has a movable throttle valve 22 which is controlled by a throttle servo 24. A manifold air pressure (MAP) sensor 26 detects the intake manifold air pressure.

The control electronics are encompassed in a Full Authority Digital Electronic Control (FADEC) 30. The FADEC 30 includes, inter alia, a CPU unit 32, a ROM 34, and a RAM 36. In the present embodiment, the FADEC 30 is a 16 bit microcontroller based on the Intel 8096 microprocessor which was used in previous generations of Ford engine ECU's. The fuel is metered and fuel injection is controlled by the FADEC using the speed-density method. The system features distributorless electronic ignition with double fire capacity. The FADEC controller is housed in a sealed enclosure with liquid cooling for high altitude applications. The integration of the single lever power controller software was found, in the present embodiment, to be most efficient as a sub-routine of the FADEC control program. The SLPC subroutine receives the relevant power plant parameters (to be discussed below), performs the SLPC algorithms (also to be discussed below) and delivers control parameters at the end of each control cycle. The FADEC software also controls engine performance parameters such as injection, spark, mix, etc. (To be discussed below)

Inputs to the FADEC which are used in the SLPC algorithm include flight condition inputs such as the true air speed 38, the ambient air pressure 40, and the ambient air temperature 42. Input from the single lever 44 is provided to the FADEC 30 through the line 46.

The FADEC 30 receives inputs from the various engine control sensors and provides control outputs to the various servos as depicted in FIG. 1. Specifically, the CPU 32 outputs throttle servo commands to the throttle servo 24, and receives MAP sensor signals from the MAP sensor 26. The CPU 32 also outputs servo commands to the pitch servo 6, and receives RPM sensor signals from the RPM sensor 8.

For controlling the engine performance parameters, the CPU 32 also receives a number of engine status parameters such as Exhaust Gas Temperature (EGT), Cylinder Head Temperature signals (CHTs), Universal Exhaust Gas Oxygen sensor signals (UEGO), Air Charge Temperature signals (ACT), Mass Airflow signals (MAF), and the Exhaust Pressure Signals (PEXH), over a bus 50. In the preferred embodiment, these signals comprise analog signals which may vary between −10 and +10 volts, preferably + or −5 volts, or as available.

The CPU 32 outputs to the engine 2 control signals to control the injectors, the spark, and the fuel/air mix, on a bus 52. Again, in the preferred embodiment, the signals are analog signals varying between 0 and 5 volts, or as required. Of course, some or all of the signals provided into and out of the FADEC may be digital signals.

A display 54 may be coupled to the FADEC 30 to display the MAP command and/or the propeller RPM command. For example, where the system according to the present invention is advisory only and does not actually output commands to change engine and propeller performance, displayed MAP and RPM commands may provide the pilot with suggested settings for the intake manifold pressure and propeller RPM.

3. The Functions

Figure 2:
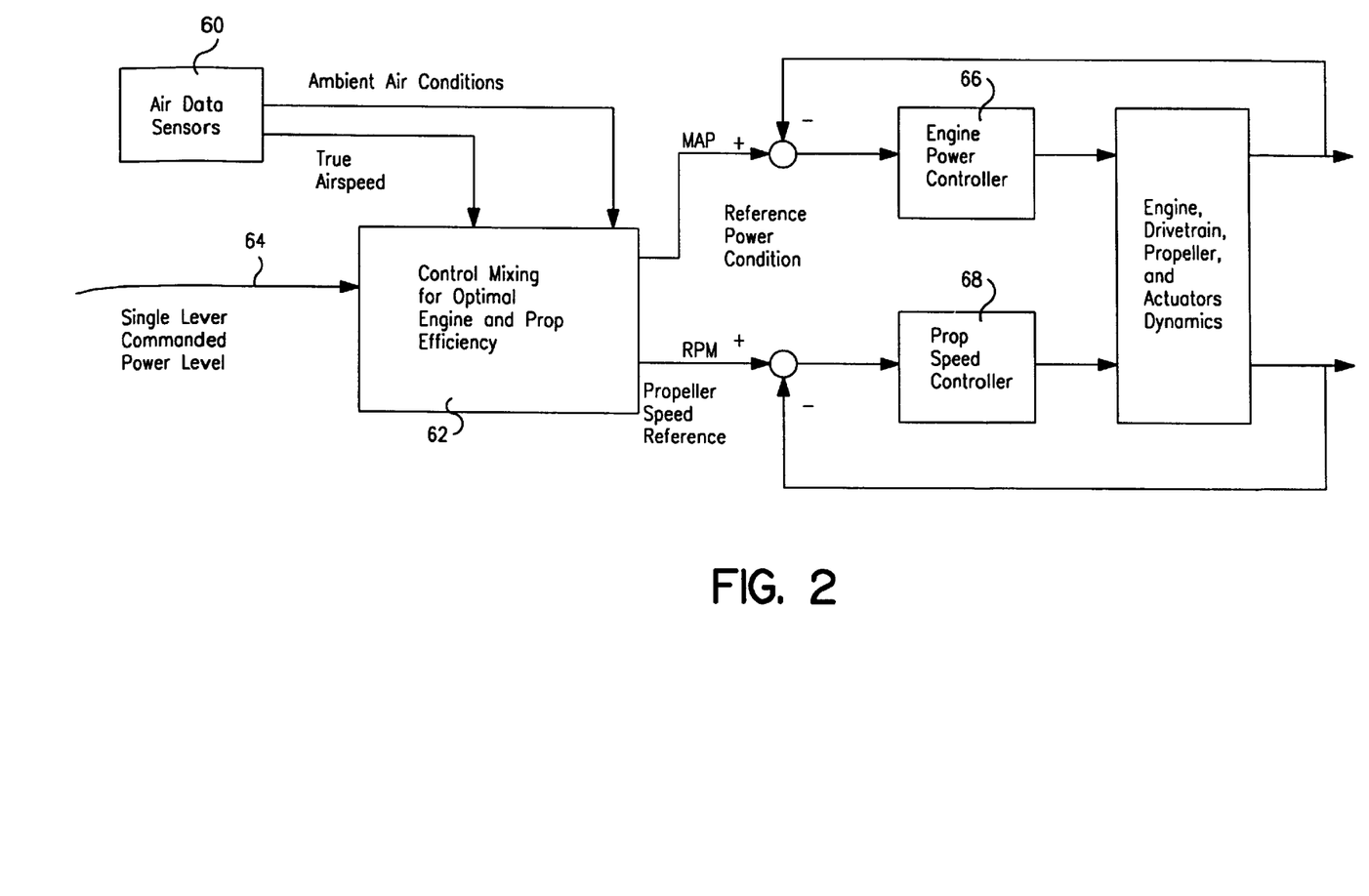
FIG. 2 is a functional block diagram of the embodiment depicted in FIG. 1.

FIG. 2 is a functional block diagram showing the salient features of the SLPC algorithm. Briefly, the FADEC 30 (FIG. 1) receives both the detected air flight conditions and the commanded thrust, and uses these values to access one or more look-up tables stored in ROM 34 or RAM 36. The look-up table will provide an RPM command and a MAP command which will achieve the best thrust efficiency for the detected values. The control algorithm and the look-up tables can be loaded into an existing flight computer from a disk. Alternatively, the algorithm and look-up tables may be provided in a separate computer to provide the pilot with an advisory message rather than activate the control servos.

In more detail, the system constantly monitors the air data sensors 60, thus knowing the true air speed, altitude, and ambient air conditions. This information is employed in the control mixing algorithm 62 to select the optimum combination of the engine speed and power (or load) setting to maximize the thrust efficiency achieved, i.e., maximum efficiency of the combined engine and propeller power unit at the detected flight condition. Thrust efficiency may be defined as:

$$n_{total} = n_{propeller} \times n_{engine} \quad (1)$$

$$= TV/P \times P/m_{fuel\ rate} \quad (2)$$

$$= TV/m_{fuel\ rate}. \quad (3)$$

Where n is efficiency, T is thrust, P is the engine output power, V is the true airspeed, and $m_{fuel\ rate}$ is the mass fuel flow rate. Therefore, the maximum $n_{total}$ at any V is $T/m_{fuel\ rate}$.

In operation, the pilot commands the desired thrust percentage 64 by using the single lever 44 (FIG. 1). The control mixing algorithm (preferably, a software subroutine running in the FADEC 30) transforms the input thrust percentage into a MAP set point to control the engine power/load controller 66 which, in the proposed embodiment, drives the throttle servo 24 and the waste gate servo 20 (FIG. 1) to achieve the desired inlet manifold pressure. On non-turbo charged engines, the throttle servo alone is driven to achieve the desired inlet manifold air pressure. The control algorithm 62 also outputs a propeller speed set point (RPM) to the propeller speed controller 68 which, in the preferred embodiment, includes pitch servo 6, to control propeller speed by actuating the propeller pitch until the measured speed matches the speed set point.

With the desired thrust indicated by the thrust lever, the control mixing algorithm 62 interpolates stored tabulated data (to be discussed below) to determine the MAP and RPM that will maximize thrust efficiency at this commanded thrust. Such an interpolation must be handled very carefully, since the optimum MAP and RPM positions may not follow well-defined, linear functions. For example, as will be shown below, in the preferred embodiment, the optimum conditions follow irregular boundaries of MAP and RPM.

Figure 3:
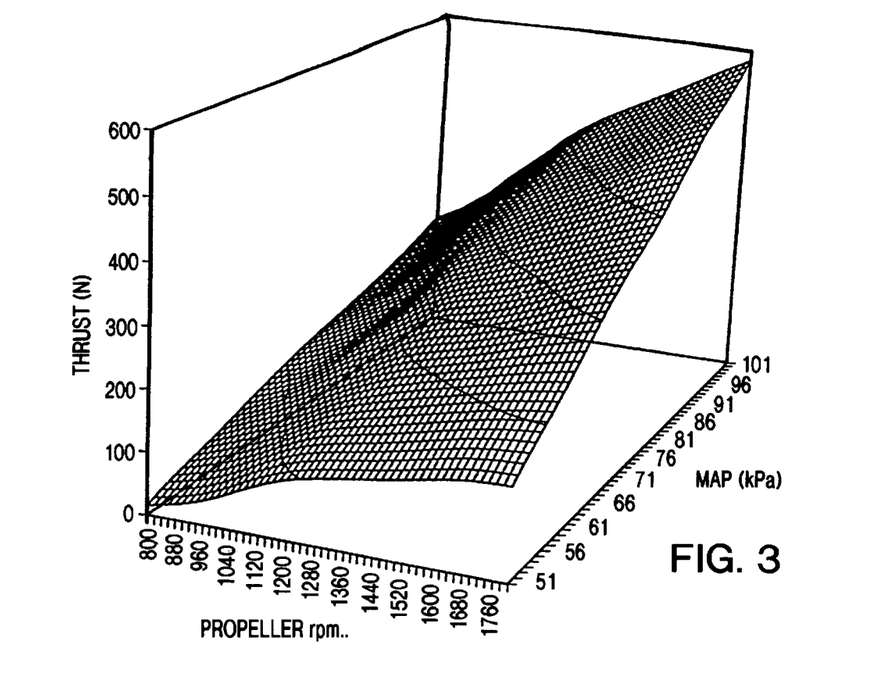
FIGS. 3 and 4 are three-dimensional graphs depicting single lever power control optimization according to the embodiment of FIG. 1.
Figure 4:
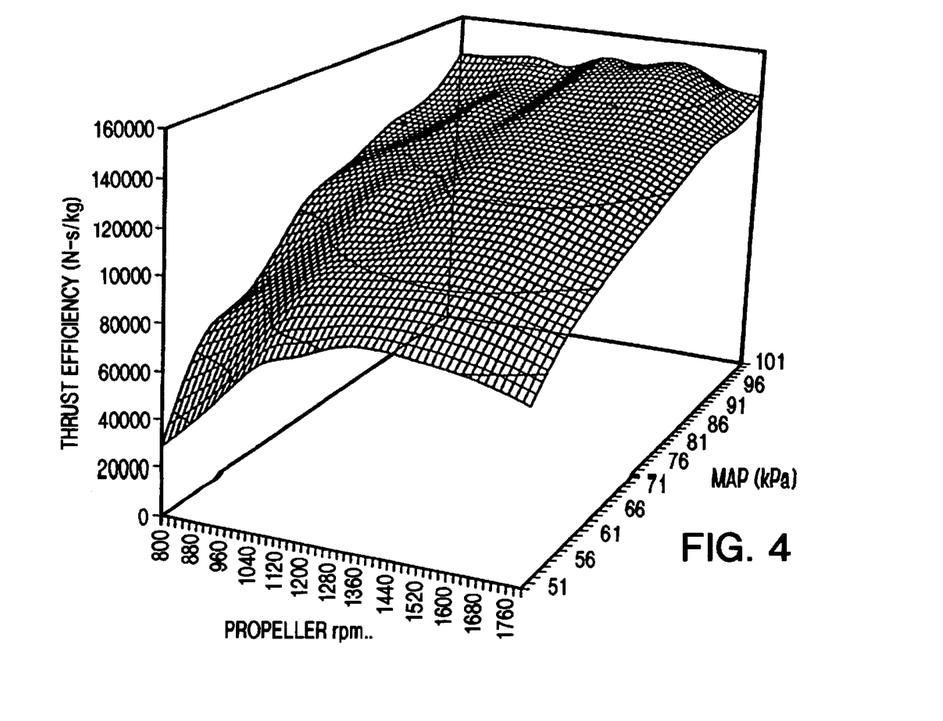

The power output of engine 2 is controlled in flight by two primary variables, MAP and RPM. The power output and specific fuel consumption are characterized by testing and/or prediction as functions of MAP and RPM. The propeller is characterized by maps of power coefficient and efficiency versus advance ratio, which in turn are functions of RPM, density, velocity, and propeller pitch angle. The optimization algorithm maximizes the thrust efficiency of the combined propulsion system. Typical curves of thrust and thrust efficiency for the engine/propeller combination of the preferred embodiment are depicted in FIGS. 3 and 4. These curves are predetermined by testing and/or prediction based on the particular aircraft/powerplant combination over a plurality of flight conditions.

It can be seen from the thrust plot of FIG. 3 that many different RPM and MAP combinations will produce a given thrust contour line. The optimization algorithm 62 must find the point on any constant-thrust contour line that maximizes thrust efficiency. For a two-variable problem, (e.g., RPM and MAP) with two parameters (pressure altitude and airspeed), the solution can be found without the need for lengthy iterative optimization. The most efficient operating point can be selected by a process which may be visualized by projecting the thrust contours of FIG. 3 onto the thrust efficiency surface of FIG. 4. The large amount of data collected for this optimization lends itself readily to a numerical adaptation of this method. The same results can be produced by using a multi-variable optimizer with side constraints to represent the upper and lower bounds on RPM and MAP, and inequality constraints to represent the desired thrust.

Optimization of the two-variable, two-parameter problem is relatively straightforward. Surfaces of thrust and thrust efficiency are generated versus RPM and MAP at each altitude and air speed (indicated air speed is used for this example, though the propeller performance depends on true air speed). A discrete contour of constant thrust versus RPM and MAP is found on FIG. 3 and projected onto the corresponding surface of thrust efficiency in FIG. 4. The maximum point of this contour on the FIG. 4 curve, subject to operational constraints as described below, is the optimum operating point where best thrust efficiency is achieved.

For example, FIG. 3 is the thrust versus RPM and MAP curve for the Perseus B aircraft at an altitude of 14 kilometers with an air speed of 35 meters per second. The pilot commands the thrust percentage through the single lever 44 and a contour of appropriate RPM and MAP pairs to achieve this thrust is a particular contour line on FIG. 3. This contour line is projected downward onto the thrust efficiency curve of FIG. 4. The RPM and MAP pair which, when projected onto the thrust efficiency surface of FIG. 4, yields highest thrust efficiency will be selected to output the MAP and RPM setpoint signals to control the engine MAP and propeller RPM. This optimization process will be described in more detail with respect to FIGS. 5–7.

Figure 5:
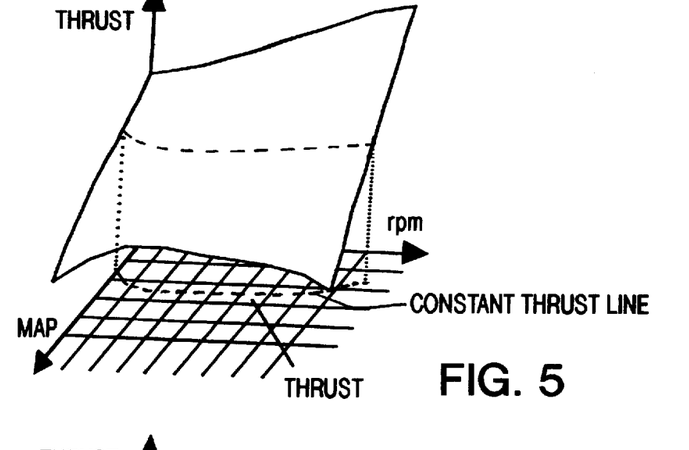
FIGS. 5, 6, and 7 are for explaining the process of optimizing the thrust efficiency using the embodiment depicted in FIG. 1.
Figure 6:
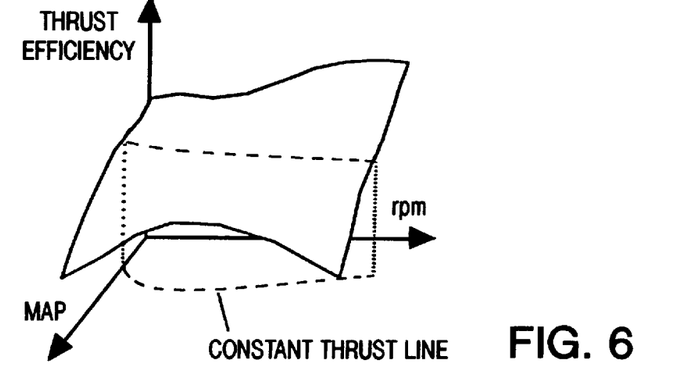
Figure 7:
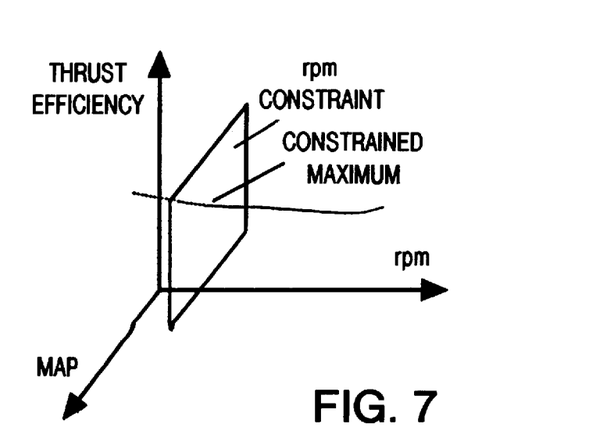

Since the final output of the optimization algorithm is a set of RPM and MAP data versus altitude, air speed, and thrust, these data are stored in the FADEC 30 in look-up table form and read directly or interpolated to obtain optimum conditions at any altitude, air speed, and thrust. In FIG. 5, a constant-thrust contour is obtained for the commanded thrust and the detected ambient air flight conditions. This contour is projected onto the RPM-MAP plane. For this example, the contour is represented by a series of points describing intersections with the RPM-MAP grid lines. In FIG. 6, the RPM-MAP contour pairs are mapped onto the thrust efficiency curve. The thrust contour is re-projected onto the thrust efficiency surface, and the result of the operation is a discrete 3D curve. In FIG. 7, the maximum thrust efficiency may be constrained for safety and other operating conditions. For example, a safe-operating envelope may be imposed on the projected thrust efficiency curve, and the maximum thrust efficiency within the constraint is located to yield RPM/MAP setpoints to control the engine and propeller.

An example optimization is described below for the Perseus B propulsion system detailed above. Using existing flight performance data and simulation software, thrust and thrust efficiency are calculated for 51 RPM points (800–1800 RPM), 52 MAP points (50–101 kPa), 3 air speeds (25–35 m/s indicated), and 4 altitudes (0–14 km). Results for the engine/propeller combination show that the locus of optima follow the lowest allowable RPM for a given thrust, with only one exception at 10 km and 80% thrust. This is believed to be due to the nonlinear nature of combined engine and propeller efficiency.

Figure 8:
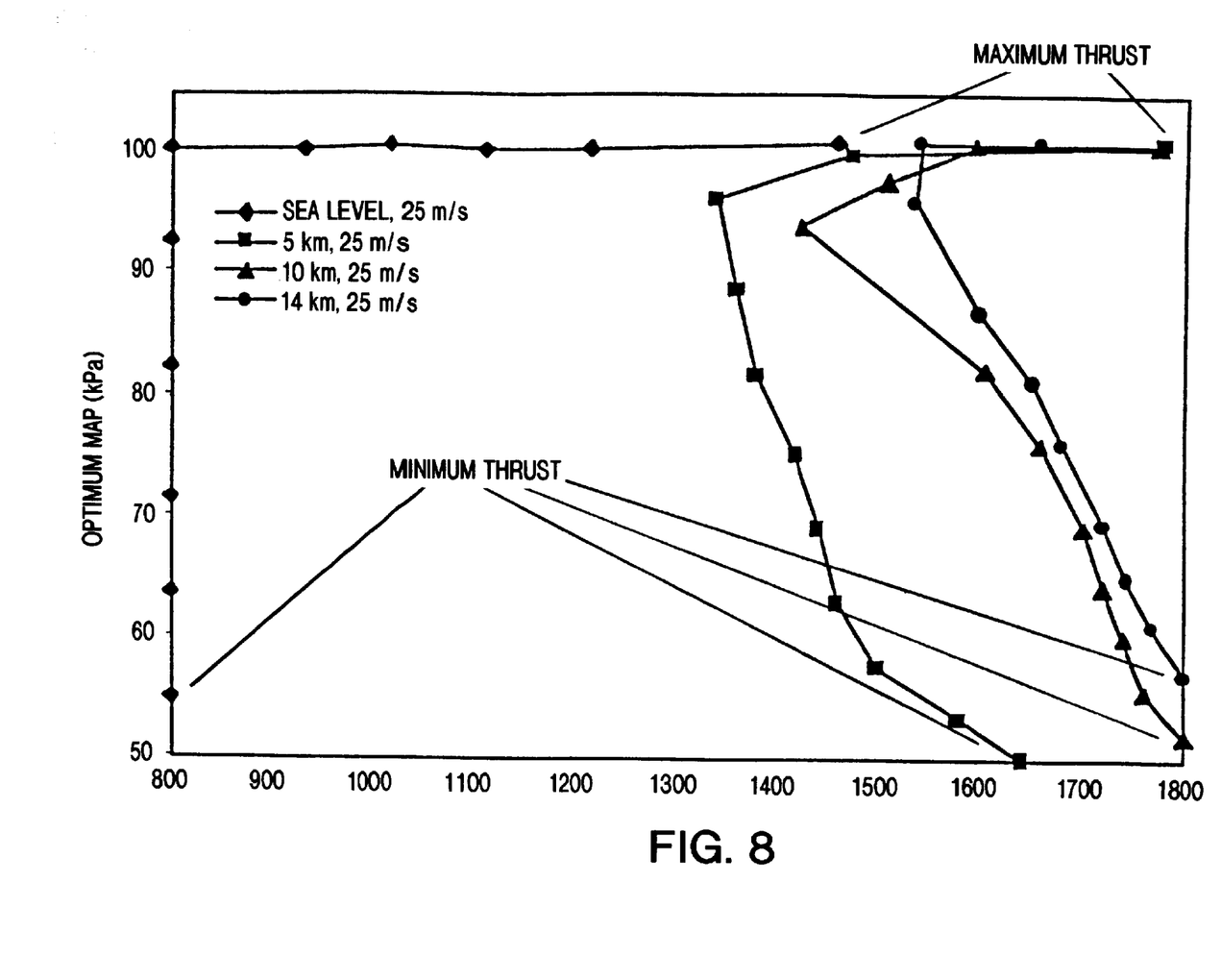
FIG. 8 is an optimum RPM versus optimum MAP graph showing the constrained optimum loci for a Perseus B unmanned aircraft incorporating the structure of the FIG. 1 embodiment.

FIG. 8 depicts the constrained optimum loci for the Perseus B. The curves follow the lower MAP and RPM bounds imposed on the propulsion system by the operating requirements of the turbo chargers. For example, a single air speed case is plotted here, and optima for this case are not functions of air speed. This is because operation of the Perseus B is limited by engine and propeller constraints such as: minimum MAP required to keep the turbo chargers running, as a function of altitude; corresponding minimum RPM at the minimum MAP; maximum propeller RPM (due to structural considerations) as a function of altitude; and maximum allowable MAP.

Figure 9:
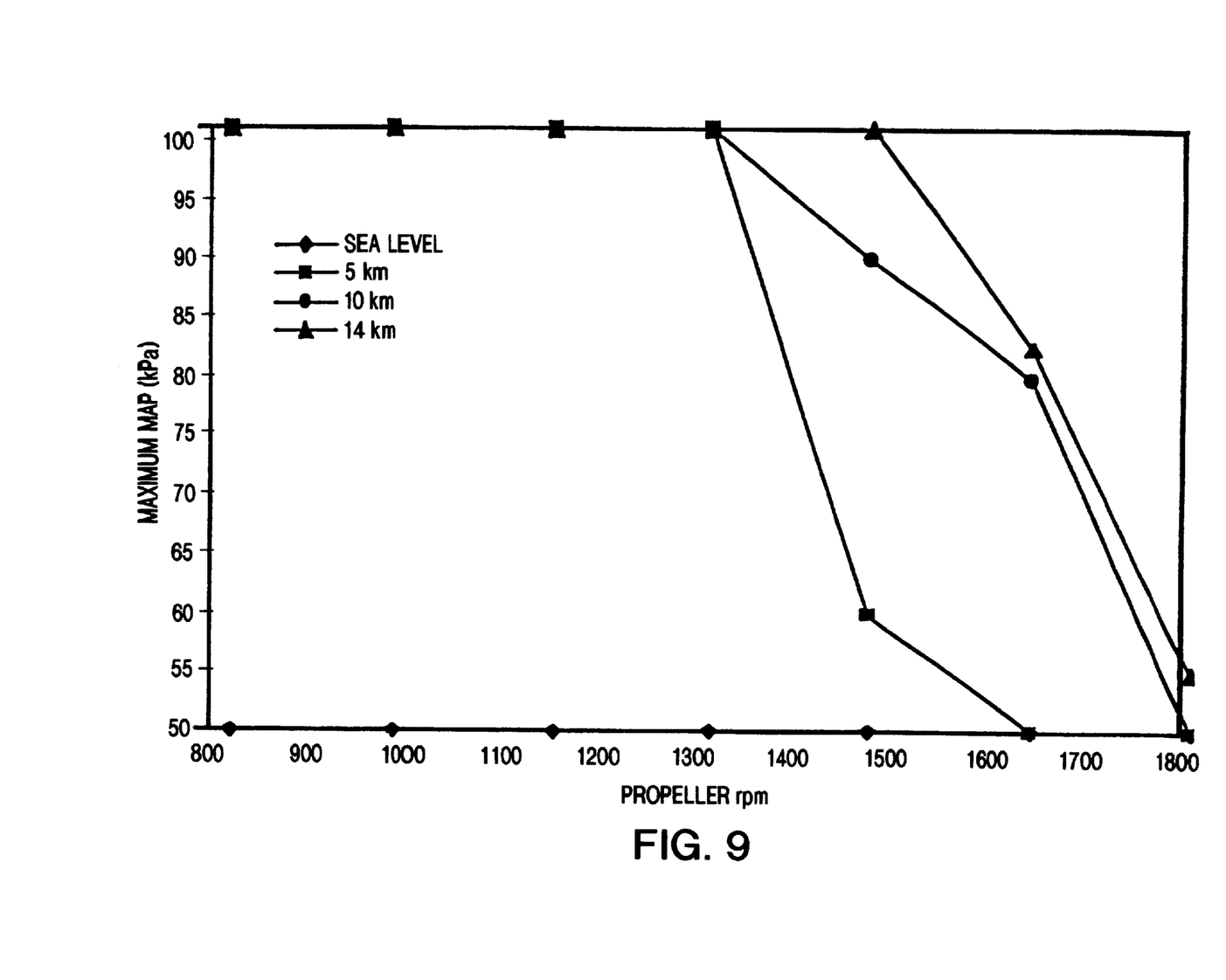
FIG. 9 is a propeller RPM versus minimum MAP graph depicting constraint envelopes for the Perseus B aircraft referenced in FIG. 8.

FIG. 9 depicts constraint envelopes for the Perseus B at four altitudes. Operation is permitted toward the upper right of the plot. The minimum MAP and RPM limits are imposed by the turbo chargers, which require a minimum mass flow function. The maximum MAP is imposed by the engine capability. The maximum RPM is imposed by the propeller structural considerations at low altitude, and by the engine red-line at high altitudes.

It has been found that operation at off-optimum conditions can result in seriously degraded performance. This is evident with respect to FIGS. 10 and 11. Currently, the Perseus B is flown by setting the propeller to its maximum RPM and controlling the thrust by varying MAP. Specific fuel consumption for this flight condition is compared to that for optimum operation. The improvement in specific fuel consumption is maximized near 70–80% of maximum thrust. Since the cruise setting is often close to or within this range, improvement in fuel consumption is readily and immediately obtainable by operating at the optimized condition.

Figure 10:
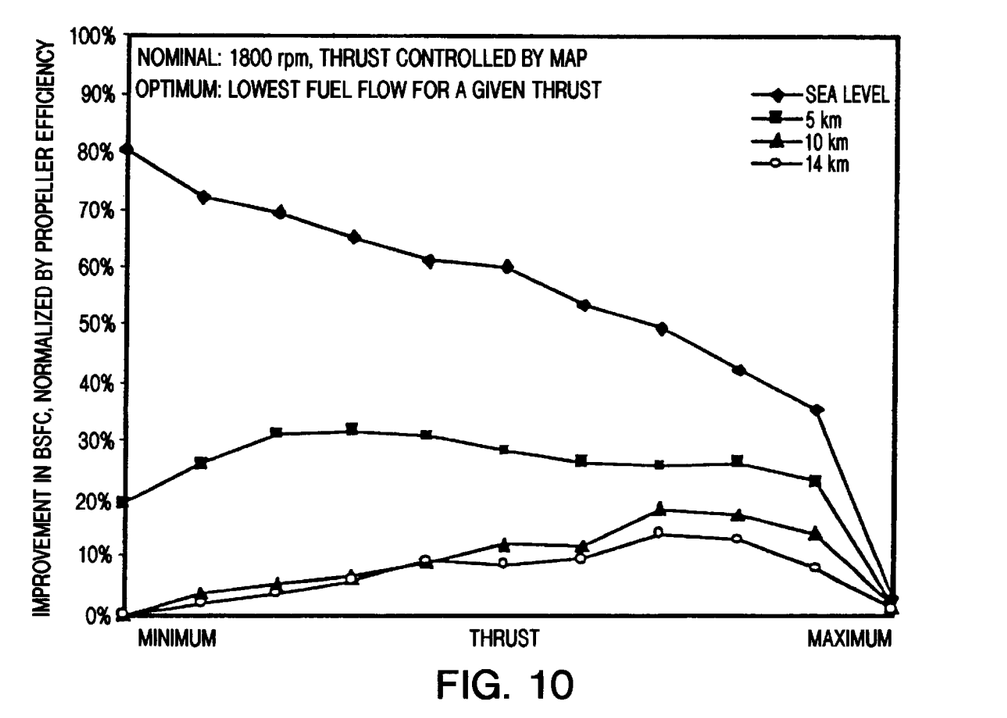
FIG. 10 is a thrust versus improvement in normalized specific fuel consumption graph for the Perseus B aircraft referenced in FIG. 8.
Figure 11:
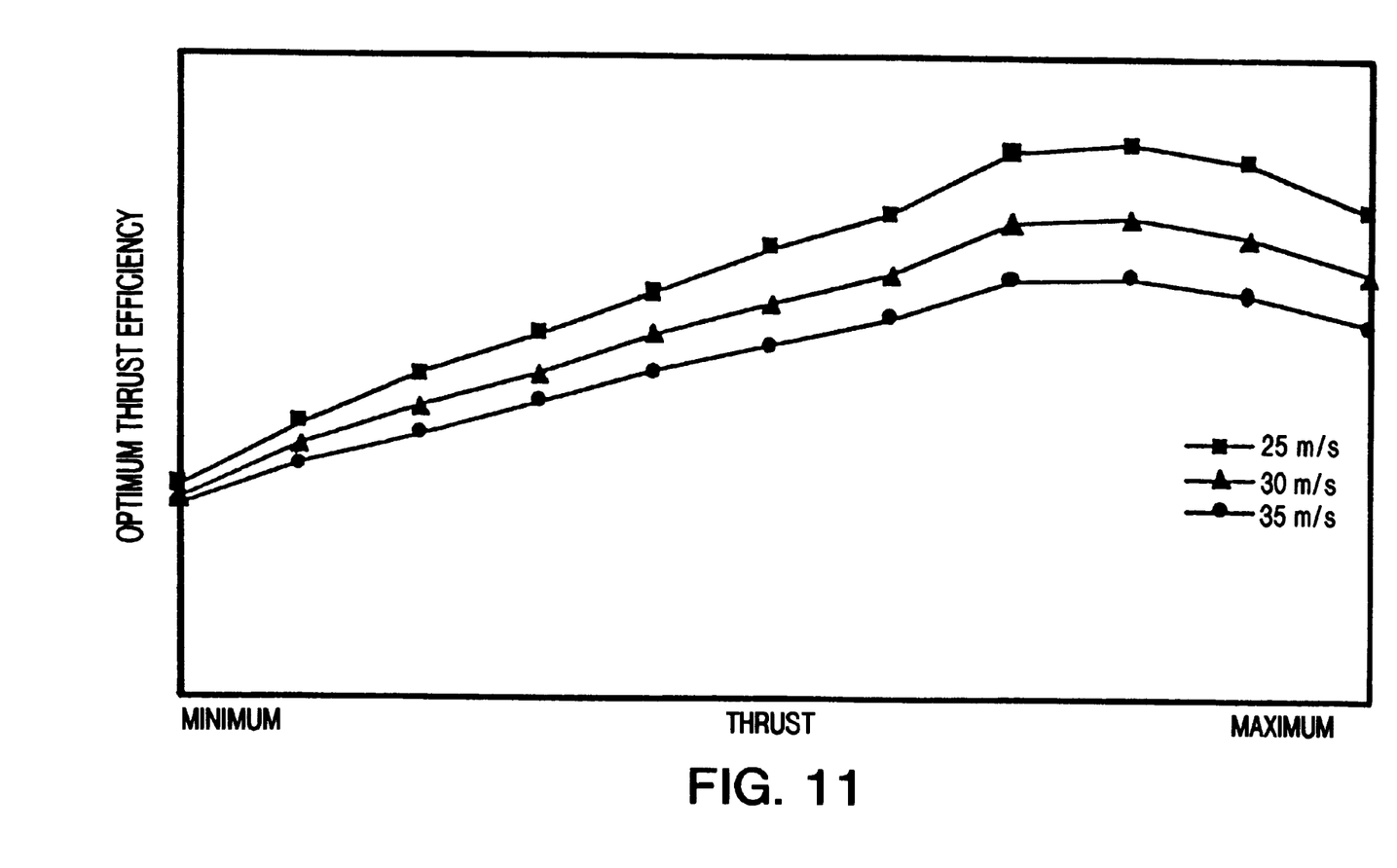
FIG. 11 is a thrust versus optimum thrust efficiency graph for the Perseus B aircraft referenced in FIG. 8.

FIG. 10 depicts a normalized specific fuel consumption comparison at 25 m/s indicated air speed. At cruise altitude, improvement in fuel efficiency over current operational methods is maximized near the cruise thrust. At thrust levels approaching the maximum, however, the thrust efficiency decreases somewhat with increasing thrust. This can be seen in the data plotted in FIG. 11. Between 80% and 100% thrust, the optimum efficiency decreases consistently by 8%. FIG. 11 depicts the thrust efficiency optima for the Perseus B at an altitude of 10 km.

The foregoing embodiments utilize stored MAP and RPM values (either directly or through interpolation) to control the throttle and propeller pitch servos. However, it is possible to obtain MAP and RPM values through an "on-line" optimization algorithm which essentially varies the MAP and RPM values in flight and then determines if there is any change in the rate of climb. If there is an increase in the rate of climb, then these new MAP and RPM values must be more efficient for the detected flight conditions and commanded thrust. These new RPM and MAP values can then be written into the look-up table to replace the previous values. In this manner the stored RPM and MAP values may constantly be improved, or, alternatively, this on-line optimization process may be used to create the look-up tables while the aircraft is in flight.

In more detail, the SLPC described earlier automatically selects MAP and RPM values for a desired power setting, where the MAP and RPM values are predetermined in an off-line optimization process and stored in the FADEC look-up table. This allows the system to get close to the optimum propulsive efficiency, except for the effects of uncertainty in the models used in the off-line optimization. The on-line optimization algorithm discussed above fine tunes the base off-line optimization to achieve true optimal propulsive efficiency in flight by continually seeking the optimum in real time. This process also corrects for engine/airframe wear and part replacements.

The on-line system functions on the principle that the rate of climb (ROC) of an aircraft flying at constant equivalent airspeed can be approximated as directly proportional to the excess power output from the propulsion system in the mean, i.e. averaged over long enough time scales such that the effects of atmospheric disturbances are eliminated from the equation:

$$Mass * g * ROC = P_{available} - P_{required} \quad (4)$$
$$= P_{excess}.$$

Controlling the aircraft to maintain a constant ROC (which may be zero for cruise at constant altitude, or may be some nonzero value for climb or descent) is, in effect, the same as controlling the excess power to some constant value which meets the desired ROC requirement. The excess power, in turn, may be one of an infinite number of combinations of RPM and MAP, such that clearly there will be some combinations of MAP and RPM which will yield the highest efficiency.

The on-line optimization is effective when selected in cruise mode with the aircraft trimmed for constant speed flight. If autopilots (such as airspeed hold and climb rate hold) are selected, the on-line optimization algorithm can be set to run continuously. The output from the algorithm will be adjustments to the commanded MAP and RPM commands. Additionally, the adjustments may be used to replace or write new values in the look-up table. Thus, the on-line optimization algorithm adaptively optimizes the thrust efficiency, and permits in-flight generation/modification of the look-up tables.

4. Conclusion

The single lever power controller structure and functions described above can simplify pilot operational tasks and greatly improve engine and propeller performance by selecting the best thrust efficiency for the commanded thrust and detected flight conditions.

The individual components shown in outline or designated by blocks in the Drawings are all well-known in the aircraft engine control arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A single lever power control apparatus for controlling an aircraft powerplant, comprising:

a manually-operable lever for generating a pilot thrust command; and a processor, coupled to said lever, for (i) receiving the generated pilot thrust command, (ii) receiving a plurality of detected ambient air conditions, (iii) receiving a plurality of detected powerplant performance parameters, (iv) concurrently determining first and second powerplant control commands based on the received pilot thrust command, the detected ambient air conditions, and the powerplant performance parameters, and (v) outputting first and second output signals respectively corresponding to the first and second powerplant control commands.

2. An apparatus according to claim 1, wherein said detected ambient air conditions include airspeed and air pressure.

3. An apparatus according to claim 1, wherein said first powerplant control command comprises a powerplant speed command, and wherein said second powerplant control command comprises a powerplant load command.

4. An apparatus according to claim 3, wherein said powerplant load command comprises a manifold air pressure command.

5. An apparatus according to claim 4, wherein said powerplant speed command comprises a propeller RPM command.

6. An apparatus according to claim 5, wherein said plurality of detected engine performance parameters include propeller RPM and manifold air pressure.

7. An apparatus according to claim 1, wherein said processor (i) stores plural sets of first and second powerplant control parameters which yield highest thrust efficiency for the detected ambient air conditions and thrust command, and (ii) concurrently selects the one set of first and second powerplant control commands which corresponds to the detected ambient air conditions and the received pilot thrust command.

8. A single lever power control apparatus for controlling an aircraft powerplant, comprising:
- a manually-operable lever for generating a pilot thrust command; and
- a processor, coupled to said lever, for (i) receiving the generated pilot thrust command, (ii) receiving a plurality of detected ambient air conditions, (iii) receiving a plurality of detected powerplant performance parameters, (iv) determining first and second powerplant control commands based on the received pilot thrust command, the detected ambient air conditions, and the powerplant performance parameters, and (v) outputting first and second output signals respectively corresponding to the first and second powerplant control commands,
- wherein said processor alters the first and second powerplant control commands, determines a rate of climb from the detected ambient flight conditions, and adjusts at least one of the first and second powerplant control commands based on the rate of climb.

9. A control apparatus for use with a single lever aircraft engine power controller, said apparatus comprising:
- a first input for receiving detected airspeed;
- a second input for receiving detected air pressure;
- a third input for receiving a thrust command from the single lever;
- a memory for storing propeller RPM and manifold air pressure commands which maximize thrust efficiency for predetermined airspeed, air pressure, and thrust command conditions;
- a processor for concurrently determining a propeller RPM command value and a manifold air pressure command value from said memory to produce maximum thrust efficiency for the detected airspeed, the detected air pressure, and the received thrust command;
- a first output for outputting a propeller RPM actuator command based on the determined propeller RPM command value; and
- a second output for outputting a manifold air pressure actuator command based on the determined manifold air pressure command value, said first and second outputs being provided concurrently.

10. An apparatus according to claim 9, further comprising a fourth input for receiving detected air temperature, and wherein said processor determines the propeller RPM command value and the manifold air pressure command value based on the detected airspeed, the detected air temperature, the detected air pressure, and the received thrust command, to yield maximum thrust efficiency.

11. An apparatus according to claim 9, further comprising a fifth input for receiving detected propeller RPM, and a sixth input for receiving detected manifold air pressure.

12. An apparatus according to claim 11, wherein the processor determines the propeller RPM actuator command based on the detected propeller RPM and the determined propeller RPM command value, and concurrently determines the manifold air pressure actuator command based on the detected manifold air pressure and the determined manifold air pressure command value.

13. An apparatus according to claim 9, wherein the processor concurrently determines the propeller RPM command value and the manifold air pressure command value based on a maximum thrust efficiency for the detected airspeed, the detected air pressure, and the received thrust command.

14. A control apparatus for use with a single lever aircraft engine power controller, said apparatus comprising:
- a first input for receiving detected airspeed;
- a second input for receiving detected air pressure;
- a third input for receiving a thrust command from the single lever;
- a memory for storing propeller RPM and manifold air pressure commands which maximize thrust efficiency for predetermined airspeed, air pressure, and thrust command conditions;
- a processor for determining a propeller RPM command value and a manifold air pressure command value from said memory to produce maximum thrust efficiency for the detected airspeed, the detected air pressure, and the received thrust command;
- a first output for outputting a propeller RPM actuator command based on the determined propeller RPM command value; and
- a second output for outputting a manifold air pressure actuator command based on the determined manifold air pressure command value [Apparatus according to claim 9,
- wherein the aircraft engine comprises a turbo-charged engine, and wherein the processor determines a turbo charger boost command value based on the detected airspeed, the detected air pressure, and the received thrust command.

15. An apparatus for controlling an aircraft engine having a rotating mechanism and an air inlet, said apparatus comprising:
- a single, manually-activated structure for providing an engine thrust command; and
- a processor for receiving the engine thrust command and detected ambient air conditions, and for concurrently determining first and second control commands for the aircraft engine, said processor concurrently determining said first and second control commands based on the received engine thrust command, and the detected ambient air conditions, to achieve maximum thrust efficiency.

16. An apparatus according to claim 15, wherein said processor receives detected airspeed, air pressure, and air temperature, and wherein said first control command comprises an engine rotation command and said second control command comprises an engine air inlet command.

17. An apparatus according to claim 16, wherein said processor receives an engine rotation measured value and an engine air inlet measured value, and wherein said processor concurrently provides (i) an engine rotation actuator signal based on the engine rotation command and the engine rotation measured value, and (ii) an engine air inlet actuator signal based on the engine air inlet command and the engine air inlet measured value.

18. A method of controlling an aircraft engine with a single lever power controller, comprising the steps of:
- generating an engine thrust command with the single lever;
- detecting ambient air flight conditions;
- concurrently determining an engine rotation command and an engine load command based on the generated thrust command, the detected ambient air flight conditions, and a predetermined maximum thrust efficiency value for the detected ambient air flight conditions and thrust command; and
- concurrently outputting first and second control signals based, respectively, on the engine rotation command and the engine load command.

19. A method according to claim 18, wherein the first control command comprises a propeller RPM signal, and wherein the second control command comprises an air inlet manifold pressure signal.

20. A method according to claim 18, wherein the step of detecting an ambient air flight condition comprises the steps of detecting (i) an airspeed, (ii) detecting an air pressure, and (iii) detecting an air temperature.

21. A method according to claim 18, further comprising the steps of:

receiving an engine rotation measured value;

receiving an engine load measured value;

determining the first control signal based on the engine rotation measured value and the engine rotation command; and determining the second control signal based on the engine load measured value and the engine load command, the steps of determining the first control signal and determining the second control signal being performed concurrently.

22. A storage medium for storing computer-readable instructions for causing an aircraft computer to control an aircraft engine, comprising:

instructions for causing the aircraft computer to read a thrust command from a manually-operable single lever;

instructions for causing the aircraft computer to read detected ambient air flight conditions; and instructions for causing the aircraft computer to access a memory with the thrust command and the flight conditions and to concurrently determine therefrom a predetermined engine rotation command and a predetermined engine load command, the engine rotation command and the engine load command being predetermined for maximum thrust efficiency at the detected ambient air flight conditions and the read thrust command.

23. A storage medium according to claim 22, further comprising:

instructions for causing the aircraft computer to read an engine rotation measured value and an engine load measured value; and instructions for causing the aircraft computer to concurrently output (i) an engine rotation actuator signal based on the engine rotation command and the engine rotation measured value, and (ii) an engine load actuator signal based on the engine load command and the engine load measured value.

* * * * *